Dec. 2, 1969    G. R. COURNOYER ET AL    3,481,016
DRIVEN CONTROLLED DEFLECTION ROLL
Filed Jan. 15, 1968    3 Sheets-Sheet 1
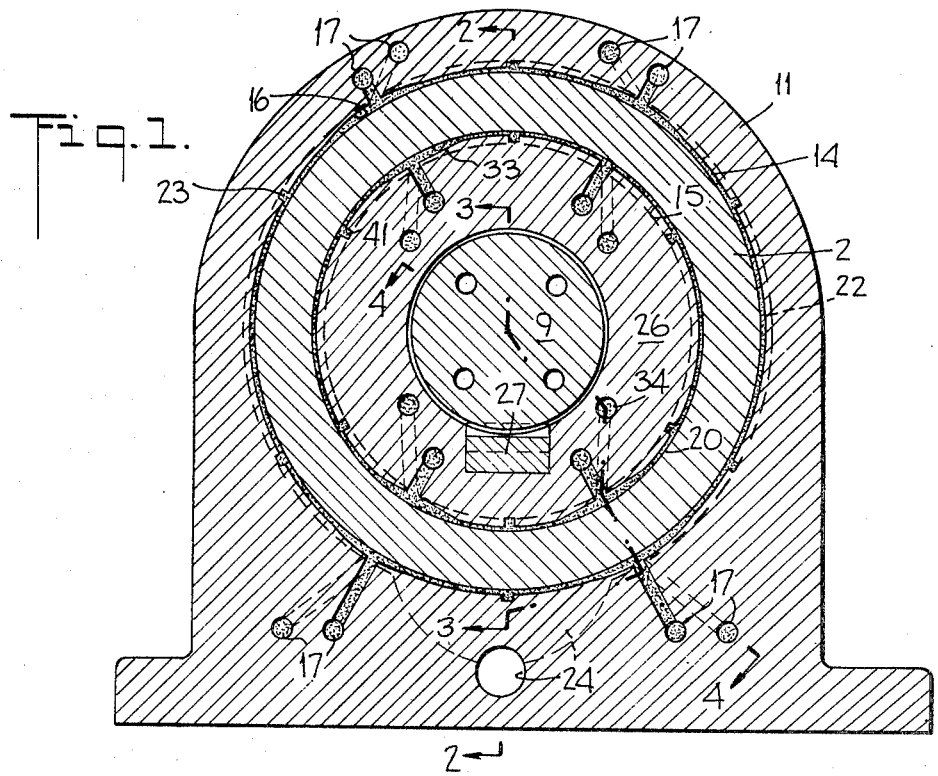
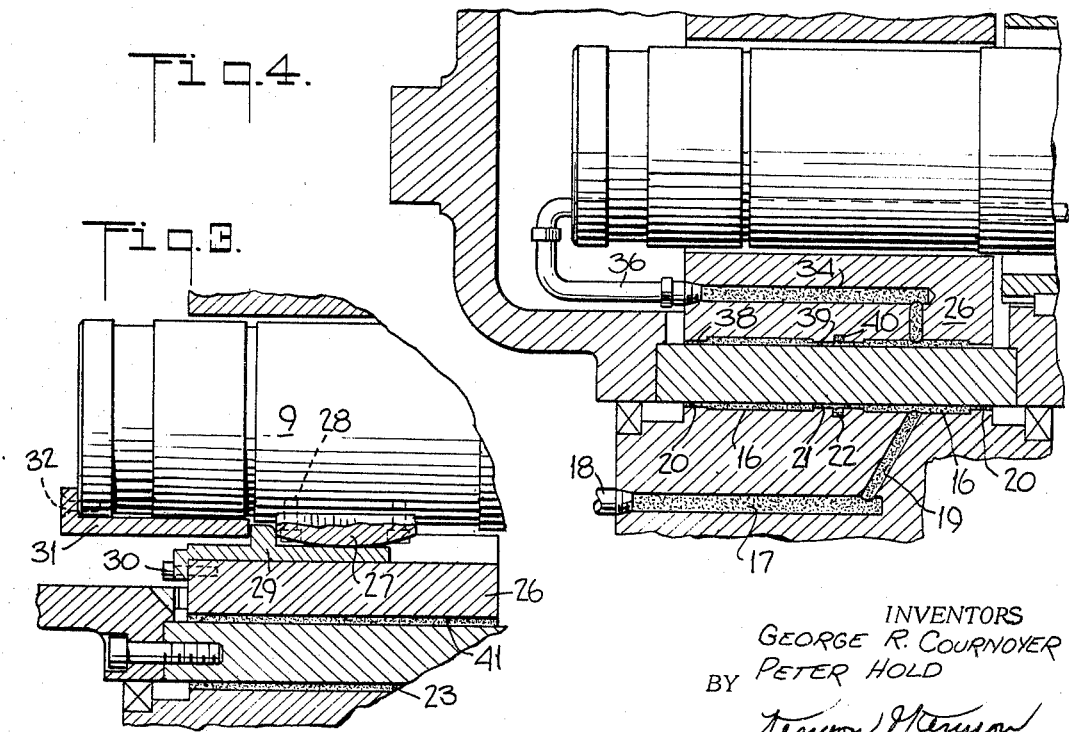
INVENTORS
GEORGE R. COURNOYER
PETER HOLD
BY
ATTORNEYS

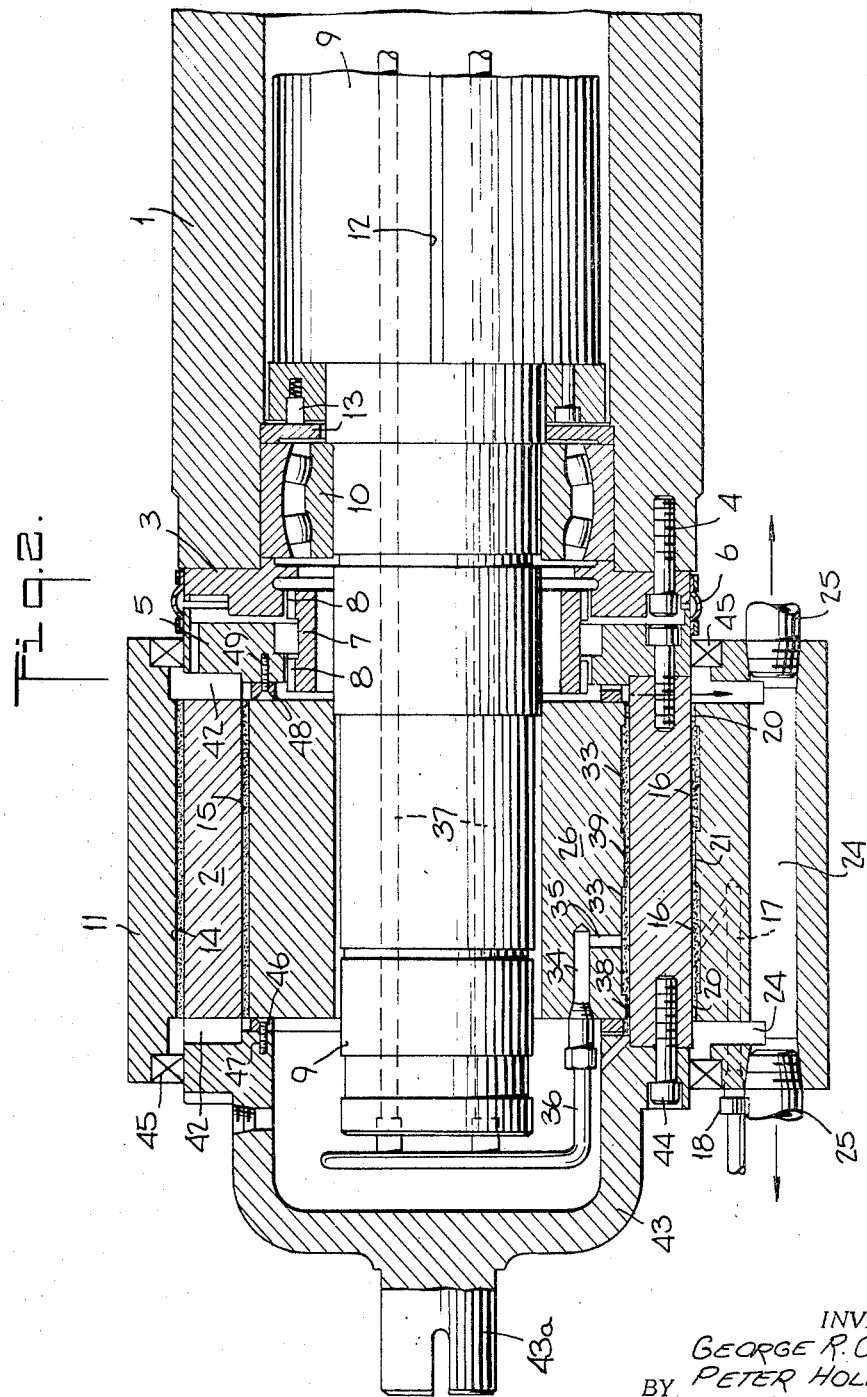

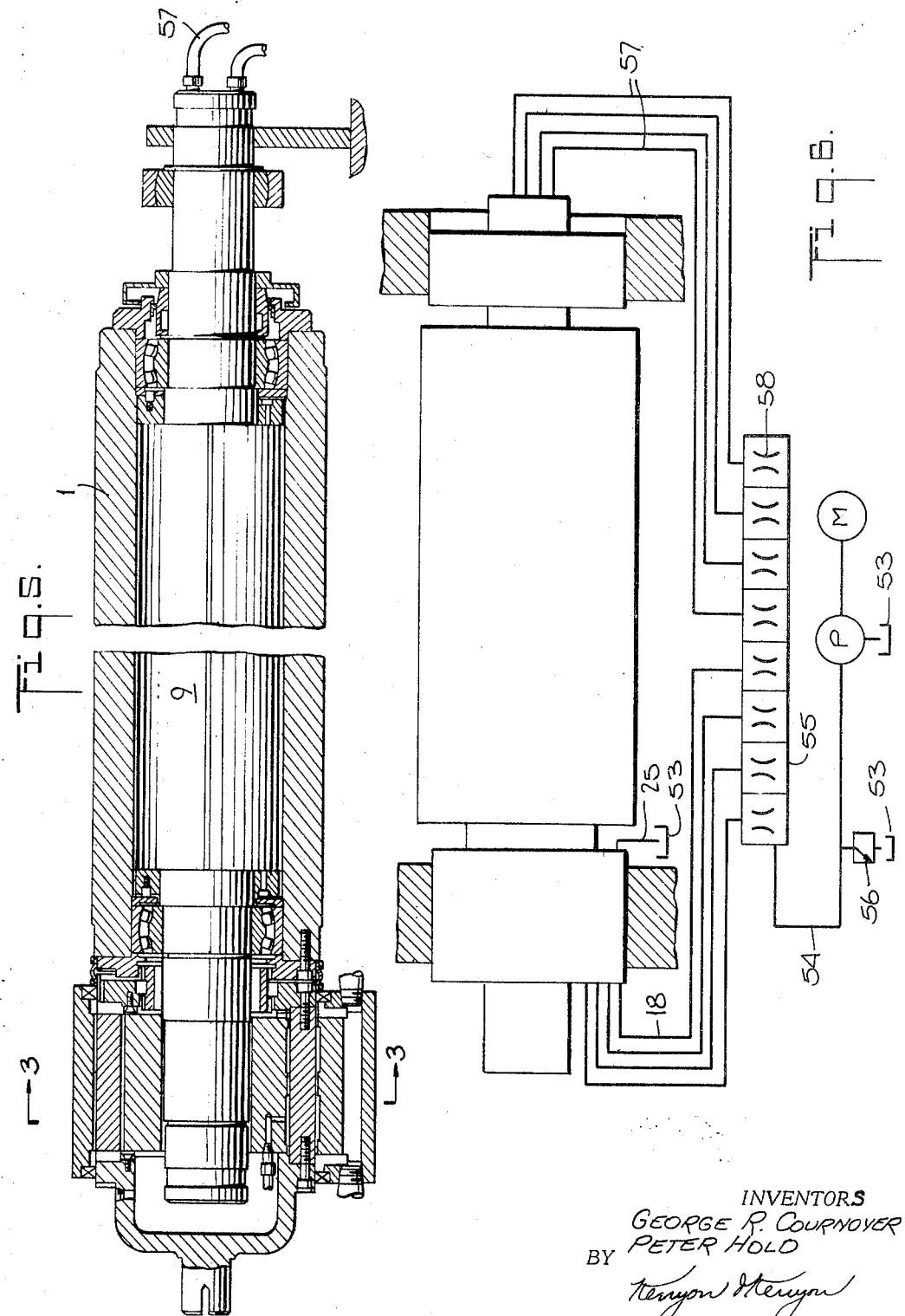

United States Patent Office 3,481,016
Patented Dec. 2, 1969

3,481,016
DRIVEN CONTROLLED DEFLECTION ROLL
George R. Cournoyer, Huntington, and Peter Hold, Milford, Conn., assignor to Farrel Corporation, Ansonia, Conn., a corporation of Connecticut
Filed Jan. 15, 1968, Ser. No. 697,754
Int. Cl. B21b 13/02
U.S. Cl. 29—116                                          8 Claims

ABSTRACT OF THE DISCLOSURE

A driven controlled deflection roll has a driving assembly of the type ordinarily using inner and outer anti-friction bearings, provided with hydrostatic bearings which permit a reduction in the over-all diameter of the assembly and other advantages.

---

This invention relates to driven controlled deflection rolls of the type disclosed by the E. J. Justus Patent 3,286,325, Nov. 22, 1966, and the H. E. Kuehn Patent 3,290,897, Dec. 13, 1966.

Such a roll includes an assembly comprising a roll having a rolling body which does the work pressure rolling work and at least one roll neck connected therewith, either rigidly as in the Justus patent or flexibly as in the case of the Kuehn patent. The roll body and neck are in the form of rotative cylindrical shells, and a non-rotative shaft extends through the roll body and neck with radial space therebetween.

A housing, which is the part supported by the frame of the calender, mill or the like using the roll, journals the roll neck, heretofore through the medium of anti-fraction bearings. Self-aligning bearing means journal the non-rotative shaft in the rotative neck so that the latter supports the shaft, and here again anti-friction bearings have been used.

Means are provided for applying roll deflection control pressure between the inside of the roll and the shaft, this causing the shaft to flex as a beam with, in turn, angular deflection of the shaft's portion supported in the roll neck by the self-aligning bearing means.

When the roll neck is rigidly connected to the roll body the neck, rotatively held by the housing, supports the roll body. When the roll body and neck are flexibly interconnected, a self-aligning bearing between the shaft and the adjacent end of the roll body supports the latter on the shaft.

All of the foregoing refers to the driving end of the roll. The other or undriven end may be mounted by a housing which encircles another roll neck at that end and which is rigidly connected to the roll body with a self-aligning bearing between the roll neck and shaft, the latter extending outwardly so that it may be anchored against rotation. Another mounting for the undriven end of the roll is by not having a roll neck at that end and mounting the shaft, which extends beyond the roll body at that end, rockingly in a housing with the roll body at that end journaled on the shaft by a self-aligning bearing. The first of these arrangements is commonly used when at the driving end the roll neck is rigidly connected to the roll body, while the secondly described arrangement is commonly used when the roll neck is flexibly connected to the roll body.

The use of anti-friction bearings between the housing and the roll neck, and between the latter and the shaft, has several disadvantages. One is the space required by any such bearing which ordinarily consists of two races running on interposed rolling elements, this meaning that the housing must be of such large diameter as to prohibit its use with frames having housing windows of restricted size. Another disadvantage is than anti-friction bearings involve metal to metal contact between the running parts which even with the best of lubricating techniques involve more rapid wear than is desirable. A further disadvantage is that anti-friction bearings are of limited load carrying ability, particularly when engineered with space restrictions in mind.

Contrasting with anti-friction bearings, hydrostatic bearings have no need for interposed rolling elements and therefore are compact radially, they are free from metal to metal contact between their running parts and they have high load carrying ability even when designed with radial space limitations in mind.

However, hydrostatic bearings require a constant flow of liquid through a flow restrictor. That is to say, liquid must flow both to and from such bearings, and heretofore this requirement has appeared to prevent their use as the bearings required at the driving end of a controlled deflection roll.

Incidentally, if the reader is unfamiliar with hydrostatic bearings, reference should be had to text on this subject such as the "Cast Bronze Hydrostatic Bearing Design Manual," published by Cast Bronze Bearing Institute, Inc. It is to be understood that metals other than bronze may be used in the construction of these bearings.

With the foregoing in mind and as a brief summarization, the present invention is characterized in general by the roll neck, whether rigidly or flexibly connected to the roll body, having a cylindrical surface on its outside forming a hydrostatic bearing runner. The housing has a plurality of circumferentially interposed hydrostatic bearing pads on its inside and which are shaped to conform to the cylindrical runner on the outside of the roll neck. Further, the self-aligning bearing arrangement between this roll neck and the shaft is provided by the roll neck having a cylindrical surface on its inside to also form a hydrostatic bearing runner. In addition, a non-rotative sleeve surrounds the shaft inside of the neck and has a plurality of circumferentially interspaced hydrostatic bearing pads on its outside and which are shaped to conform to the just described runner on the roll neck's inside. Self-aligning action is obtained by interposing a rocker between the inside of the sleeve and the shaft, the sleeve's inside being radially spaced from the shaft so that the latter can angularly deflect on the rocker.

It is to be noted that all of the pads are located on or are formed by the non-rotative housing and sleeve. Therefore without using running joints or any other impractical expedient, the flows of liquid required by the bearings formed by the pads and runners may be supplied by fixed conduits. The necessary hydrostatic bearing flow restrictors are easily arranged to choke the liquid flow to the various pads.

A specific example of a driven controlled deflection roll construction embodying the present invention is illustrated by the accompanying drawings in which:

FIG. 1 is a vertical cross-section of the roll's running parts showing the housing, neck, sleeve, shaft, pads and running surfaces of the hydrostatic bearings;

FIG. 2 is a longitudinal section taken on the line 2—2 in FIG. 1;

FIG. 3 is a longitudinal section taken on the line 3—3 showing the fragment defined by this line;

FIG. 4 corresponds to FIG. 3 but is taken on the line 4—4 in this instance;

FIG. 5 is a longitudinal section of the entire roll, omitting details of the invention shown by the preceding figures; and FIG. 6 schematically shows the flow circuitry diagrammatically.

First referring to FIG. 2, in this example the roll body 1 has the roll neck 2 connected to it flexibly through a flexible gear drive of the kind disclosed by the previously mentioned Kuehn patent. This drive includes an internal gear 3 fixed to the roll body 1 by screws 4, an internal gear 5 fixed to the neck 2 by screws 6 and a sleeve 7 having external gears 8 which mesh with the internal gears 3 and 5. The non-rotative shaft 9 journals the roll body 1 through a self-aligning antifriction bearing 10. The shaft 9 extends through the roll body 1 and roll neck 2 with radial space therebetween so that the shaft can deflect relative to the roll body 1, keeping in mind that the latter may also be required to deflect if the conditions of its work require over or under crowning.

As previously noted, the roll neck 2 must be journaled in a housing 11 and there must be self-aligning bearing means between the inside of this neck 2 and the end of the shaft 9. In other words, the load on the shaft 9 is transmitted to the inside of the roll neck 2 and from the outside of the latter to the housing 11 which is mounted in the frame of the calender or mill or other machine with which the controlled deflection roll is associated.

So far as the present invention is concerned, any means could be used for aplying the roll deflection control pressure between the inside of the roll body 1 and the shaft 9, but the only means that has ever proven to be practicable is one which confines a body of fluid between the roll body and shaft to provide a uniform pressure between the two throughout the length of the roll body with this uniform pressure exerted either directly or indirectly to these two parts. This new concept is disclosed and claimed by the Appenzeller Patents 2,908,964, Oct. 20, 1959 and 3,043,211, July 10, 1962.

In the present instance, the arrangement illustrated is that of the specific example used by the first of these Appenzeller patents to illustrate the uniform pressure concept. Thus, briefly stated, the shaft 9 has longitudinal seals 12 and an end sealing assembly 13 which divide the space between the roll body 1 and the shaft 9 into upper and lower chambers. Although not shown to avoid confusion, passages carry fluid under pressure from the righthand end of the roll via its stationary shaft to these chambers, whereby liquid under pressure may be introduced to one while any leakage may be withdrawn from the other. The specific design of this uniform pressure principle of controlling roll deflection need not be disclosed further to understand the present invention.

Continuing, and now referring to FIGS. 1–4, the roll neck 2 has its outer and inner surfaces 14 and 15 respectively formed as concentric cylindrical surfaces and these provide the two hydrostatic bearing runners. The roll neck 2 rotates as previously described. The inside of the housing 11 is also cylindrical and in the case of this example the hydrostatic bearing pads 16 are formed by recesses machined directly in the housing. They could be separate elements. The necessary flow of liquid, usually lubricating oil, is provided to each of the pads 16 through passages 17 drilled axially through the housing 11. Since the housing 11 is non-rotative, conduits 18 may be connected directly to these passages 17 without using running joints of any kind. The axial passages 17 connect individually with the various pads 16 by way of diagonal passages 19. As illustrated, there are two circumferential series of axially interspaced pads 16 with four circumferentially interspaced pads in each and the pads of each series register with the pads of the other axially with respect to the housing.

The oil flows from the various pads are axially and circumferentially through the clearances 20 and 21 maintained by the action of the bearings, to circumferential grooves 22 and axial grooves 23. These grooves 22 and 23 are interconnected and they discharge the oil through suitable openings downwardly to a drain 24 connected with discharge conduits 25.

The shaft 9 is non-rotative and as previously explained must be journaled inside of the roll neck 2 by a self-aligning bearing means.

Therefore, the shaft 9 is encircled by a sleeve 26 and a rocker plate 27 is screwed to the shaft by screws 28. This rocker plate is a cylindrical segment with its axis at right angles to the shaft's axis. It is of substantial width and it rests on a rocker bearing plate 29 connected by screws 30 to the sleeve 26. The top of this rocker bearing 29 is flat and is engaged by the rocker plate 27, and since the latter is cylindrical this prevents angular displacement of the non-rotative sleeve 26. Also, a stop 31 is screwed by screws 32 to the end of the shaft 9 for added security, the inner end of this stop being in a position to abut a raised projection on the bearing plate 29. The inside of the sleeve 26 is radially spaced from the end of the shaft 9 so that the latter can angularly deflect as previously described.

The sleeve 26 on its outside is provided with two interspaced series of circumferentially interspaced hydrostatic bearing pads 33 which correspond in number and arrangement with the pads 16 and are radially oriented or registered opposite thereto as to each pad. As in the case of the bearings journalling the neck 2 in the housing 11, the pads 33 may be supplied with the necessary oil flow by axial passages 34 drilled through the sleeve 26 with angular passages 35 leading to the pads as required to supply them with liquid, also lubricating oil in this case. The passages 34 extend towards the outer end of the sleeve 26 where they are connected to conduits 36 which in turn connect with passages 37 drilled axially through the shaft in the same manner as the unillustrated passages provided to introduce the necessary fluid pressure to control the deflection of the roll body 1. These passages 37 extend to the righthand end of the shaft 9 which is always exposed of necessity because it must be anchored against rotation. Thus, again, the passages permit connection to fixed conduits.

The oil flow from the pads 33 is axially and circumferentially through the spaces 38 and 39 which correspond to the spaces 20 and 21 of the outer bearing. The flow then passes through circumferential grooves 40 extending circumferentially from the spaces 39 and axial grooves 41 which correspond to the grooves 23 of the outer bearing. The pads and grooves in the sleeve 26 are machined directly into its outer surface but, again, could be separate elements.

Both ends of the neck 2 have a circumferential series of interspaced radial grooves 42 formed in them so that the liquid exhausting from the pads in both directions outwardly with respect to the sleeve 26 can flow downwardly to the drain 24.

The neck 2 may be connected to a source of rotary power by an end cap 43 connected to the outer end of the neck 2 by screws 44 and having a stub shaft 43a for connection with rotary driving power. Leakage between the end of the housing 11 and the rotating parts within it is prevented by appropriate seals 45. The sleeve 26 is held against axial displacement by a thrust ring 46 connected to the end cap by screws 47 and by a thrust ring 48 connected to the internal gear element 5 by screws 49. Both of these thrust rings have a series of interspaced radial grooves so that liquid can pass radially through them to provide downward drainage.

The other ends of the roll body 1 and shaft 9 may be arranged conventionally. As illustrated, the roll body 1 is journaled on the shaft 9 by a self-aligning anti-friction bearing 50 which correspond to the bearing 10. The shaft 9 projects outwardly beyond that end of the roll 1 and is mounted by a rocker bearing 51 permitting angular deflection of the shaft at that end. This bearing 51 is adapted for mounting in the frame of the calender, mill or the like, opposite to the frame in which the housing 11 is mounted. Rotation of the shaft 9 is prevented by an anchored bar 52 fixed non-rotatively to the end of the shaft 9.

It is to be noted that with the above arrangement at the undriven end there is no problem concerning radial space restrictions. However, when the roll itself is journaled in the frame as shown by the previously identified Justus patent, there is a problem concerning such restriction. In such an instance, the construction previously described may be used at the undriven end of the roll also. In this case, the roll neck 2 would be rigidly connected to the roll body 1, but the same hydorstatic bearing construction for the parts is applicable. It is only necessary to replace the driving cap 43 with a cap (not illustrated) that corresponds but does not have a stub shaft.

Referring now to the schematic diagram of FIG. 6, it can be seen that the motor M drives the pump P which draws oil from an oil tank 53 and pumps it through a conduit 54 to a manifold 55, the pressure in the conduit 54 being under the control of a pressure relief valve 56 which blows-off and back into the tank 53 as required to maintain a predetermined pressure in the conduit 54. The manifold 55 distributes the oil to the conduits 18 which lead to the lefthand end of the housing 11, and through the conduits 57 which lead to the righthand end of the shaft 9 where they connect with the passages 37 drilled lengthwise through the shaft 9 so that the oil flows through the conduits 36 and into the passages 34. The manifold 55 is a system including the necessary hydrostatic bearing load restrictors 58. These need not be made external of the roll, as shown, since the restrictors may be placed anywhere in the line of flow of oil up to the various hydrostatic bearing pads.

In FIG. 6 only four conduits 18 are shown going to the four bottom pads 16, and only four conduits 37 going to the four bottom pads 33 since the bearing can perform with only these pads pressurized. If additional self-aligning features are required all the pads can be pressurized, each through its own restrictor.

In operation, with the motor M operating, the oil flows to the various pads, in each instance through its own flow restrictor, so that the sleeve 26 floats on oil within the neck 2 and the latter floats on oil within the housing 11. The load from the shaft 9 is transmitted through the rocker bearing, comprising the parts 27 and 29, to the rotating neck 2 and the load is transmitted from this neck 2 to the housing 11 which is supported by the frame of the machine using the roll. All of the running parts float on oil in the bearing pads because of the characteristic hydrostatic bearing operation.

In other words, if, for example, the sleeve 26 starts to move downwardly towards the neck 2, because of a load increase, the spaces surrounding the pads 33 on this down side become smaller and choke the flow from these pads and then the oil pressure builds up in these pads 33 so as to in effect pump up the sleeve 26 to re-establish the dimensions of the spaces 38 and 39. The neck 2 correspondingly floats on oil in the housing 11 with the same kind of action occurring. In both instances the journaled parts are held centered by the angular locations of the pads.

Because only oil bodies are inovlved, the radial dimensions of all of the parts surrounding the shaft 9 can be reduced greatly as compared to the dimensional reductions possible when using anti-friction bearings. Obviously, there is no metal to metal contact to induce wear. Finally, because the parts float on the oil cushions between the pads and runners very large loads can be carried. Of course, it is to be understood that the pressure relief valve 56 and the capacity of the pump P should be engineered to provide a minimum pressure and flow output adequate for the bearing loading contemplated.

The usual anti-friction bearing may be used between the roll neck 2 and the housing 11 in some instances. In such a case the use of the hydrostatic bearing of the present invention only between the neck and the shaft 9, where the available space is smaller, is of advantage.

What is claimed is:

1. A driven controlled deflection roll including a roll having a rolling body and at least one roll neck connected therewith, said roll body and neck comprising rotative cylindrical shells, a non-rotative shaft extending through said roll body and neck with radial space therebetween, a non-rotative housing for mounting said neck, means for journaling said neck rotatively in said housing, self-aligning bearing means for journaling said shaft in said neck so that the latter supports the shaft, and means for applying roll deflection control pressure between said roll body and said shaft with consequent flexure of the shaft and angular deflection of the shaft's portion supported in said roll neck by said self-aligning bearing means; characterized by said means for journaling said neck rotatively in said housing comprising said neck having a cylindrical surface on its outside forming a first hydrostatic bearing runner and a plurality of circumferentially interspaced hydrostatic bearing pads on the inside of said housing and shaped to conform to said runner, said neck having a cylindrical surface on its inside forming a second hydrostatic bearing runner and a non-rotative sleeve surrounding said shaft inside of said neck and a plurality of circumferentially interspaced hydrostatic bearing pads on the outside of said sleeve and shaped to conform to said second runner and a rocker between said sleeve and said shaft, said sleeve's inside being spaced radially from said shaft so the latter can angularly deflect on said rocker, and means including hydrostatic bearing flow restrictor means for supplying said pads with flows of liquid.

2. The roll of claim 1 in which said housing has passages formed therein and extending from said pads therein to the outer end of the housing, and said liquid flow supplying means connects with said passages to supply the liquid flows to the pads on the inside of said housing.

3. The roll of claim 1 in which said sleeve has passages formed therein and extending from said pads on its outside to the outer end of this sleeve and said shaft has passages formed axially therethrough with conduit means for connecting said sleeve's passages with said shaft's passages at the shaft's end adjacent to said sleeve, and said liquid flow supplying means connects with said shaft's passages at the other end of the shaft to supply the flows to said pads on the outside of said sleeve.

4. The roll of claim 1 in which said pads on the inside of said housing are formed in the housing's inside and the latter has grooves formed therein for conducting liquid flow leaving these pads to the ends of said runner on the outside of said neck.

5. The roll of claim 1 in which said pads on the outside of said sleeve are formed in this sleeve and the outside of the latter has grooves formed therein for conducting the liquid flow leaving these pads to the ends of said runner on the inside of said neck.

6. The roll of claim 1 in which the liquid flows from said pads are axially to the ends of said neck and said housing has a drain for these flows.

7. The roll of claim 1 in which said neck extends beyond both ends of said sleeve and has radial grooves in both of its ends for passing the liquid flows from said pads downwardly to the lower portion of said housing.

8. A driven controlled deflection roll including a roll having a rolling body and at least one roll neck connected therewith, said roll body and neck comprising rotative cylindrical shells, a non-rotative shaft extending through said roll body and neck with radial space therebetween, a non-rotative housing for mounting said neck, means for journaling said neck rotatively in said housing, self-aligning bearing means for journaling said shaft in said neck so that the latter supports the shaft, and means for applying roll deflection control pressure between said roll body and said shaft with consequent flexure of the shaft and angular deflection of the shaft's portion supported in said roll neck by said self-aligning bearing means; characterized by said self-aligning bearing means comprising said neck having a cylindrical surface on its inside forming a hydrostatic bearing runner and a non-rotative sleeve surrounding said shaft inside of said neck and a plurality of circumferentially interspaced bearing pads on the outside of said sleeve and shaped to conform to said runner and a rocker between said sleeve and said shaft, said sleeve's inside being spaced radially from said shaft so the latter can angularly deflect on said rocker, and means including hydrostatic bearing flow restrictor means for supplying said pads with flows of liquid.

References Cited
UNITED STATES PATENTS

| | | |
|---|---|---|
| 3,196,520 | 7/1965 | Appenzeller. |
| 3,286,325 | 11/1966 | Justus. |
| 3,290,897 | 12/1966 | Kuehn. |
| 3,333,904 | 8/1967 | Flurscheim et al. _____ 308—9 |
| 3,359,613 | 12/1967 | Rye _____ 308—9 |
| 3,399,001 | 8/1968 | Whitaker _____ 308—9 |

WALTER A. SCHEEL, Primary Examiner

LEON G. MACHLIN, Assistant Examiner